United States Patent [19]
Darling, III

[11] Patent Number: 6,142,491
[45] Date of Patent: *Nov. 7, 2000

[54] PORTABLE CART

[75] Inventor: Charles W. Darling, III, Hampton Bays, N.Y.

[73] Assignee: North Coast Outfitters, Ltd., Hamtpn Bays, N.Y.

[ * ] Notice: This patent is subject to a terminal disclaimer.

[21] Appl. No.: 09/226,838

[22] Filed: Jan. 7, 1999

[51] Int. Cl.$^7$ ....................................................... B62B 1/12
[52] U.S. Cl. ........................ 280/30; 224/627; 280/414.2; 280/652; 280/47.18; 280/47.26; 280/47.331; 280/47.33
[58] Field of Search .................................... 280/30, 414.1, 280/414.2, 47.331, 47.3, 47.32, 63, 47.33, 652, 651, 47.18, 47.26; 224/627, 628; 296/20

[56] References Cited

U.S. PATENT DOCUMENTS

| | | | |
|---|---|---|---|
| 806,097 | 12/1905 | Baumann | 280/47.33 X |
| 910,728 | 1/1909 | Russell | 280/47.33 |
| 2,467,075 | 4/1949 | Birnberg | 280/47.33 |
| 2,868,559 | 1/1959 | Vincelette | 280/47.33 |
| 2,918,296 | 12/1959 | Goodale | 280/47.3 X |
| 2,979,338 | 4/1961 | Dwyer | 280/47.3 |
| 3,034,801 | 5/1962 | Huston | 280/47.3 X |
| 3,054,622 | 9/1962 | Davis et al. | 280/47.3 X |
| 3,159,410 | 12/1964 | Raymond | 280/414.2 X |
| 3,188,108 | 6/1965 | Davis | 280/47.331 |
| 3,236,537 | 2/1966 | Eckman | 280/47.3 X |
| 3,403,924 | 10/1968 | Oliveira | 280/63 |
| 4,055,354 | 10/1977 | Sharpe | 280/47.32 X |
| 4,214,774 | 7/1980 | Kluge | 280/47.331 X |
| 4,444,405 | 4/1984 | Barrus | 280/47.3 |
| 4,550,925 | 11/1985 | McDonough | 280/47.331 |
| 4,789,180 | 12/1988 | Bell | 280/47.33 X |
| 4,826,187 | 5/1989 | Abbott et al. | 280/47.33 X |
| 5,820,141 | 10/1998 | Wilkerson | 280/47.3 X |

*Primary Examiner*—Michael Mar
*Attorney, Agent, or Firm*—Alfred M. Walker

[57] ABSTRACT

A portable cart, for use in camping, hunting and other outdoors activities carries canoes, small boats, game, injured parties or hauled cargo by hand. The portable cart can be converted to a canoe or boat cart which can be folded down and transported within the canoe or boat, or to a game cart for transporting game over long, rough terrain, or to a cargo hauling gear cart, all of which can broken down into a carrying position, by hand or by back. The portable cart can be carried by hand or as a backpack over rough terrain. Its width can be varied to accommodate watercraft of varying widths. It is collapsible, so that it can be disassembled and carried in a canoe or small boat, and then reassembled at another destination along the canoe or boat's journey.

20 Claims, 14 Drawing Sheets

PORTABLE CART

FIELD OF THE INVENTION

The present invention relates to a portable cart, for use in camping, hunting and other outdoors activities.

BACKGROUND OF THE INVENTION

Various carts exist for carrying canoes and small boats by hand. Other outdoors-oriented carts exist for carrying game. In addition, wheelbarrows and small carts are used for transporting gear at outdoors locations. However, none of the existing carts can be converted to a versatile portable cart which can interchangeably function as a portable canoe or boat cart which can be folded down and transported within the canoe or boat, as a game cart for transporting game over long, rough terrain, or as a gear cart, all of which can broken down into a carrying position, by hand or by back.

OBJECTS OF THE INVENTION

It is therefore an object of the present invention to provide a cart for carrying canoes and small boats by hand.

It is also an object of the present invention to provide an outdoors-oriented cart for carrying game or injured parties.

It is yet another object of the present invention to provide a small cart with a well for transporting gear at outdoor locations.

It is also an object of the present invention to provide a versatile portable cart which can interchangeably function as a portable canoe or boat cart which can be folded down and transported within the canoe or boat, as a game cart for transporting game over long, rough terrain, or as a gear cart, all of which can be broken down into a carrying position, by hand or by back.

It is yet another object to provide a portable cart which is either backpackable or which can be carried by hand.

It is also an object of the present invention to improve over the disadvantages of the prior art.

SUMMARY OF THE INVENTION

In keeping with these objects and others which may be apparent, the present invention relates to a portable cart, for use in camping, hunting and other outdoors activities for carrying canoes and small boats by hand. It may also carry game, injured parties or be used for transporting gear at outdoors locations. It is a versatile portable cart which can interchangeably function as a portable canoe or boat cart which can be folded down and transported within the canoe or boat, as a carry cart for transporting game or injured parties over long, rough terrain, or as a gear cart, all of which can be broken down into a carrying position, by hand or by back.

The portable cart is under thirty (30) pounds, preferably twenty two (22) to twenty eight (28) pounds, so that it can be carried by hand or within a backpack over rough terrain. It is collapsible, so that it can be disassembled and carried in a canoe or small boat, and then reassembled at another destination along the canoe or boat's journey.

To prevent flat tires, its wheels are preferably solid core tires which cannot get flat, with stainless steel bearings, over which the wheels rotate. A typical wheel has two press fit bearings adjacent to an integrally molded hub. While the typical wheel is about 2–3 inches wide, for transporting cargo or game on sand or granular terrain, the wheels may be wider, such as 4–6 inches in width.

For hardiness, the material of the structural frame components is preferably a lightweight but strong material, such as, for example, 60–61 T6 fully anodized aluminum, or stainless steel.

The portable cart can hold up to 500 pounds, and for manual pulling easily pulls 300 pounds. The portable cart is durable to carry heavy weight over rough terrain, such as rock-strewn dirt trails or sloping riverbank surfaces.

To carry a canoe or boat, two horizontal load supports optionally include support cushions upon which the canoe or boat rests. The position of the horizontal load supports can be varied to accommodate various widths of the canoe or boat.

To function as a game or rescue cart, a frame, such as a pair of U-shaped rails which are joined end to end, is provided upon the horizontal load supports to form a rounded rectangular frame, over which a taunt, but slightly stretchable, bed of fabric is placed, such as canvas or other flexible material, i.e., plastic or netting. The bed includes sewn loops through which portions of the U-shaped rails of the frame are inserted. Other fabric fasteners such as clips, zippers or eyelets can be also used.

To function as a wagon cart with a well for carrying gear, a hollow fabric well, such as of canvas, is draped between said horizontal load members and over and around the front and rear U-shaped brackets. A cover may be provided to cover the gear therein. The well and cover can also be made of other suitable flexible materials, such as plastic, netting or canvas.

Kickstands may be optionally provided to stabilize the portable cart during rest or during loading of contents thereon.

Furthermore, the cart of the present invention can be disassembled and broken down for hand held or back pack transport and it can easily be assembled for its varied uses. Moreover, when a boat or canoe is carried, the cart has a precision balance feature that rotates the wheels to maintain the cart in a horizontal stable position.

DESCRIPTION OF THE DRAWINGS

The present invention can best be described in connection with the accompanying drawings, in which.

DETAILED DESCRIPTION OF THE PREFERRED EMBODIMENTS

As shown in the drawing FIGS. 1–20, the present invention is directed to foldable cart 1, for carrying a boat, such as a canoe, which can also function as a game cart or a wagon for carrying gear in outdoor field applications.

Figure 1:
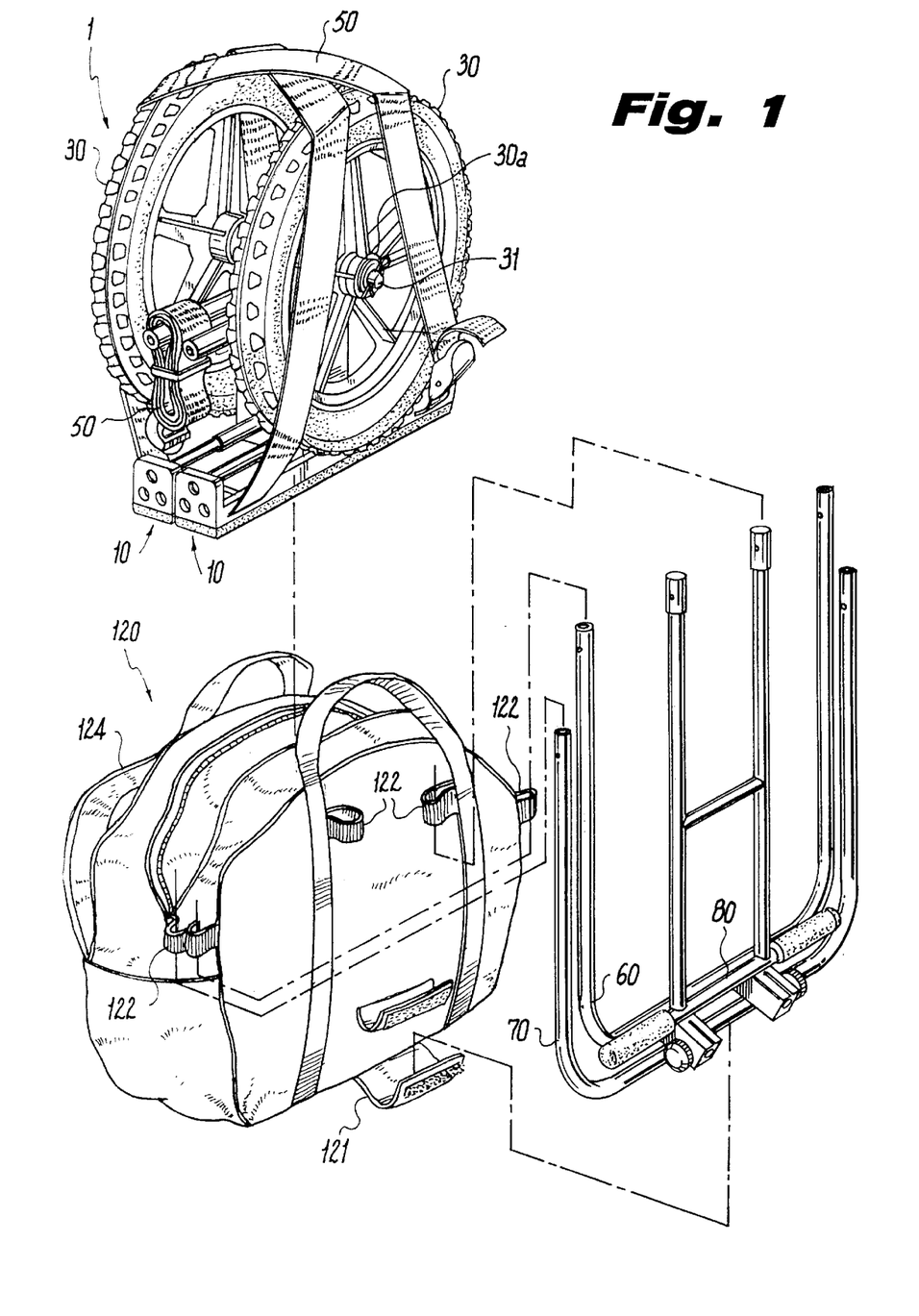
FIG. 1 is an exploded perspective view of the components of the basic cart embodiment broken down for transport within and on the storage backpack.

FIG. 1 shows cart 1 in a disassembled storage position with a pair of horizontal load support members 10 laid parallel adjacent to each other, supporting wheels 30 thereon. Wheels 30 are secured in place by a transverse connecting rod 31 through wheel hubs 30a and by load securing straps 50. Disassembled storage cart 1 is inserted within carry bag 120, which includes ledge 121 and fabric loops 122 for holding bracket members 60, 70 and handle 80 outside of carry bag 120.

Figure 2:
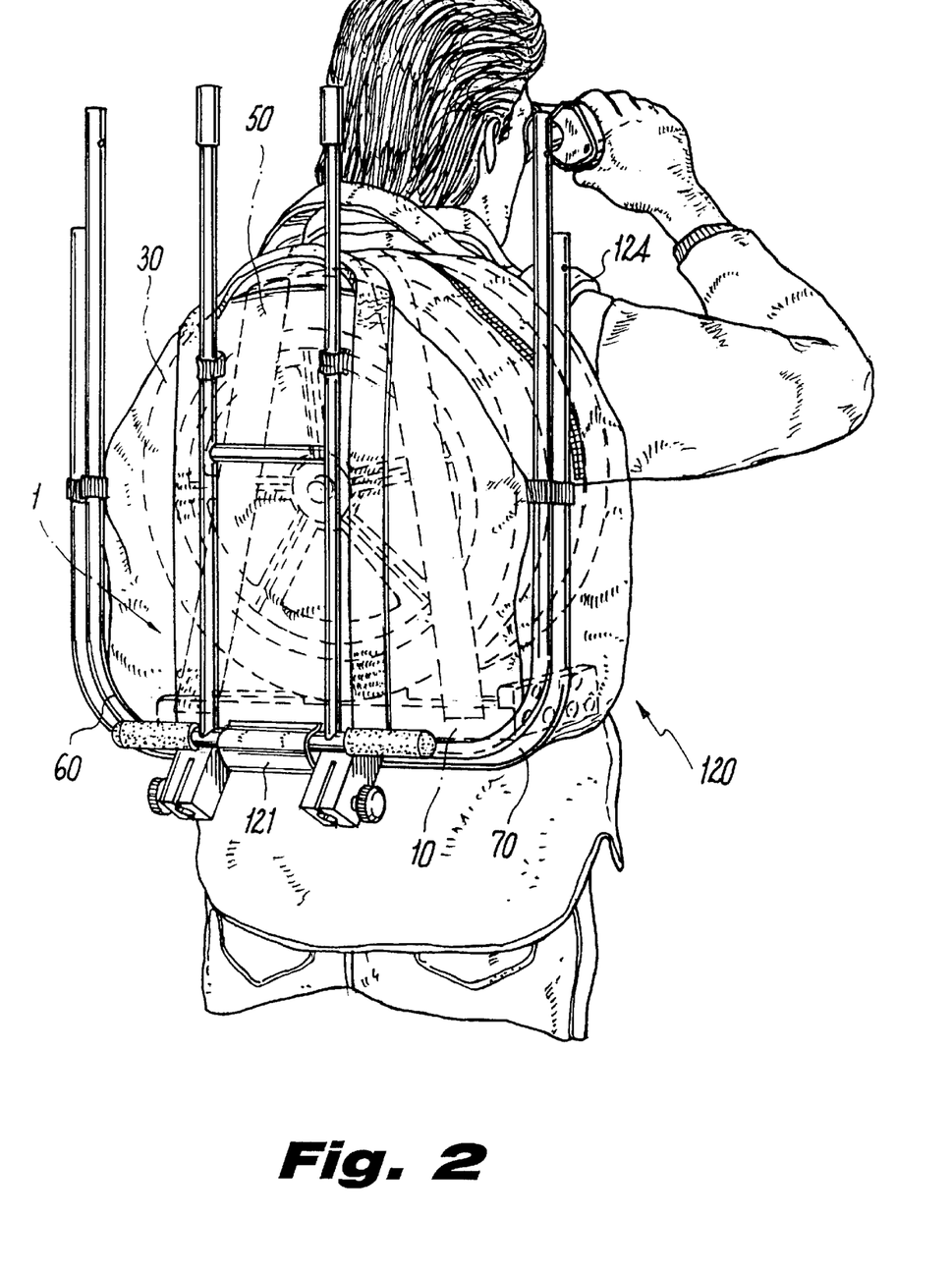
FIG. 2 is a perspective view of the backpack on a user, with the cart contained therein.

To transport portable cart 1 by hand carry straps 124a are attached to carry bag 120. Conversely as shown in FIG. 2, to transport portable cart 1 upon the back of a user, carry straps 124 are attached to carry bag 120, which supports portable cart 1 in a weight bearing manner, or else horizontal support members 10 are inverted to support portable cart 1 in a weight bearing manner, and carry bag 120 covers portable cart 1 in a non-weight bearing manner.

To be disassembled in a carry position, U-shaped brackets 60, 70, kickstand members 40, wheels 30 and axle members 32 are inversely attached to horizontal load supports 10 to comprise a folded manually transportable cart.

Figure 3:
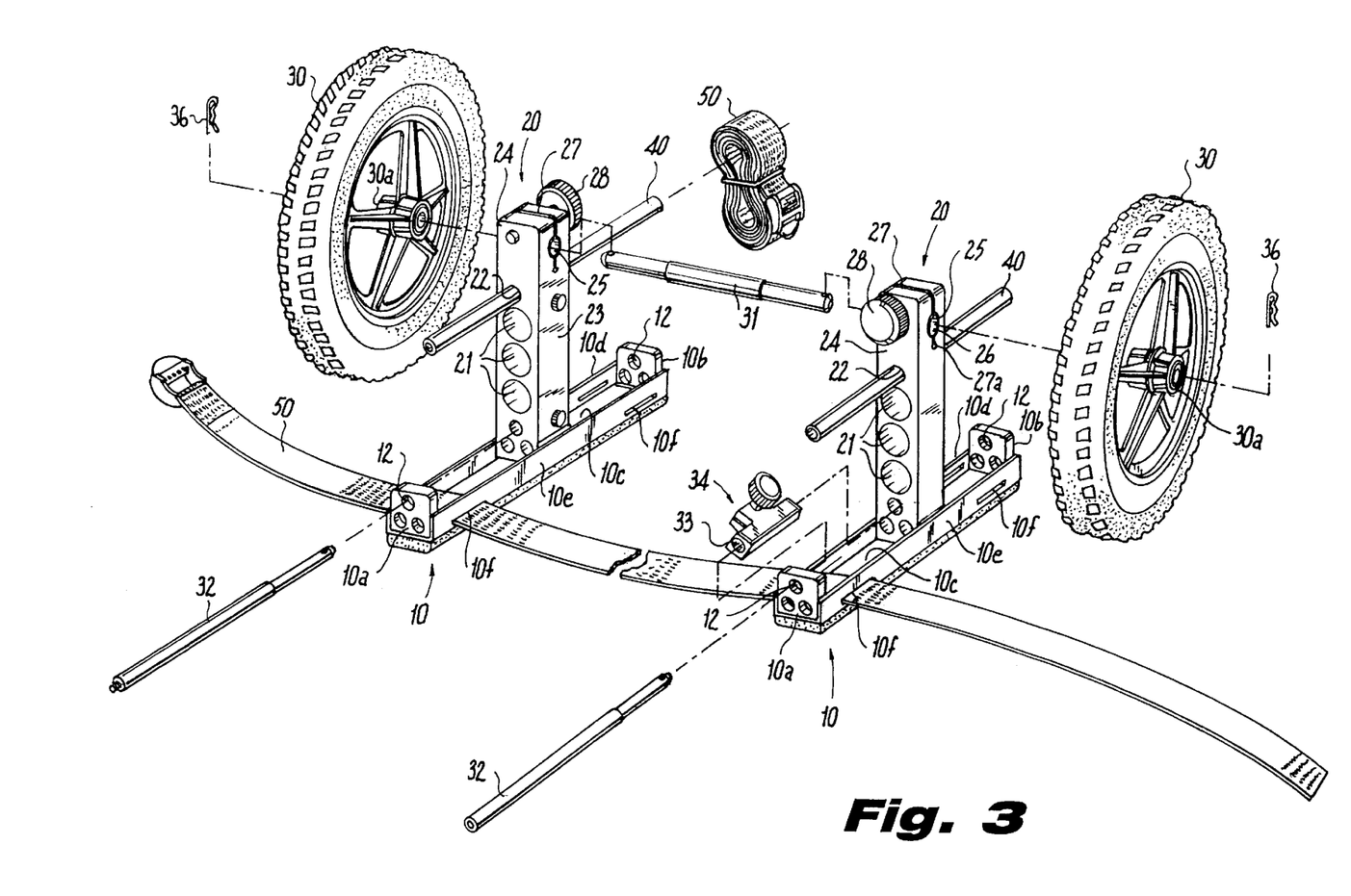
FIG. 3 is an exploded inverted perspective view of the basic cart embodiment components, disassembled from their original transport configuration.

As shown in the exploded view of FIG. 3, in the storage position, cart 1 includes a pair of parallel, spaced apart inverted horizontal load support members 10. Support members 10 each have a front end 10a and a rear end 10b. The front and rear ends 10a, 10b each have at least one axially placed receptacle aperture 12 extending longitudinally within each load support member 10, for holding structural components therethrough in a storage position, such as axle members 32 for wheels 30. In this storage position, axle members 32 are also inserted within aperture of 33 of axle connector 34.

FIG. 3 also shows horizontal load support members 10 having preferably a generally upside down U-shaped configuration when viewed in cross-section, wherein a generally flat member 10c has downwardly extending flanges 10d, 10e including one or more linearly extending slots 10f for insertion of holding straps 50 therein.

While size may vary, support member 10 is preferably sixteen (16) inches long and two and a quarter (2.25) inches wide. Each flange 10d, 10e extends down about one (1) inch from flat member 10c. Slots 10f are preferably 2.125 inches wide and 0.1875 inches high, to accommodate straps 50, such as, for example, standard 2-inch wide fabric straps.

Figure 4:
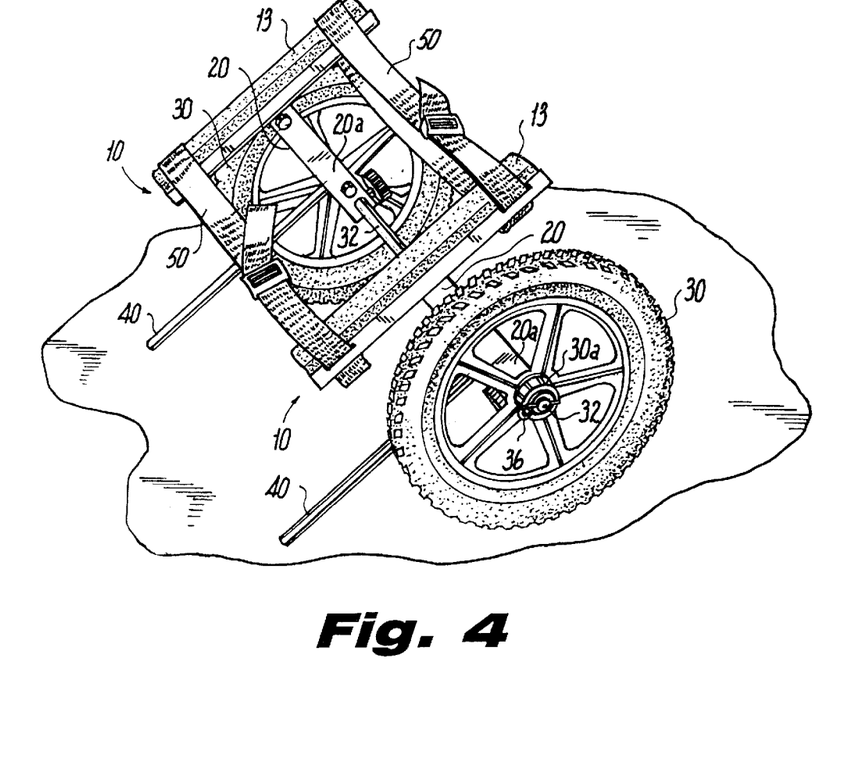
FIG. 4 is a perspective view of the assembled boat cart.

FIG. 3 also shows horizontal load support members 10 being respectively demountably attached to a pair of vertical struts 20, having apertures 21 and 22. FIG. 4 shows vertical struts 20 optionally having at least one small hole 22, such as kickstand receptacle aperture 22, for insertion of optional kickstand 40 therein. Kickstand 40 is secured in place by a fastener, such as nylon set screw 37. Set screws 37 also hold axle members 32 in the storage position through vertical struts 20.

Vertical struts 20 are preferably made from 1½×2-inch solid bar stock anodized aluminum, or stainless steel. Vertical struts 20 are preferably about 10.25 inches long, 2 inches wide and 1½ inches in depth.

Also shown in FIG. 3, the plurality of larger holes 21, such as holes which are 0.765 or 1.625 inches in diameter, are located on a front side of vertical strut 20. Smaller hole 22 on the bottom accommodates kickstand 40, which is preferably a hollow aluminum tube of 0.75-inch diameter and 16 inches in length.

Larger holes 21 within vertical strut 20 are provided for weight reduction of portable cart 1.

On a side 23 transverse to the front 24 of each vertical strut 20, at a lower portion 20a thereof, is provided a further hole 25 of about 1-inch in diameter for insertion of each axle member 32 therethrough. Hole 25 has a permanently affixed, bushing 26 therein, such as a PVC (polyvinyl chloride) bushing, to prevent wear and tear of each aluminum axle member 32 by the aluminum surface of hole 25.

Figure 6:
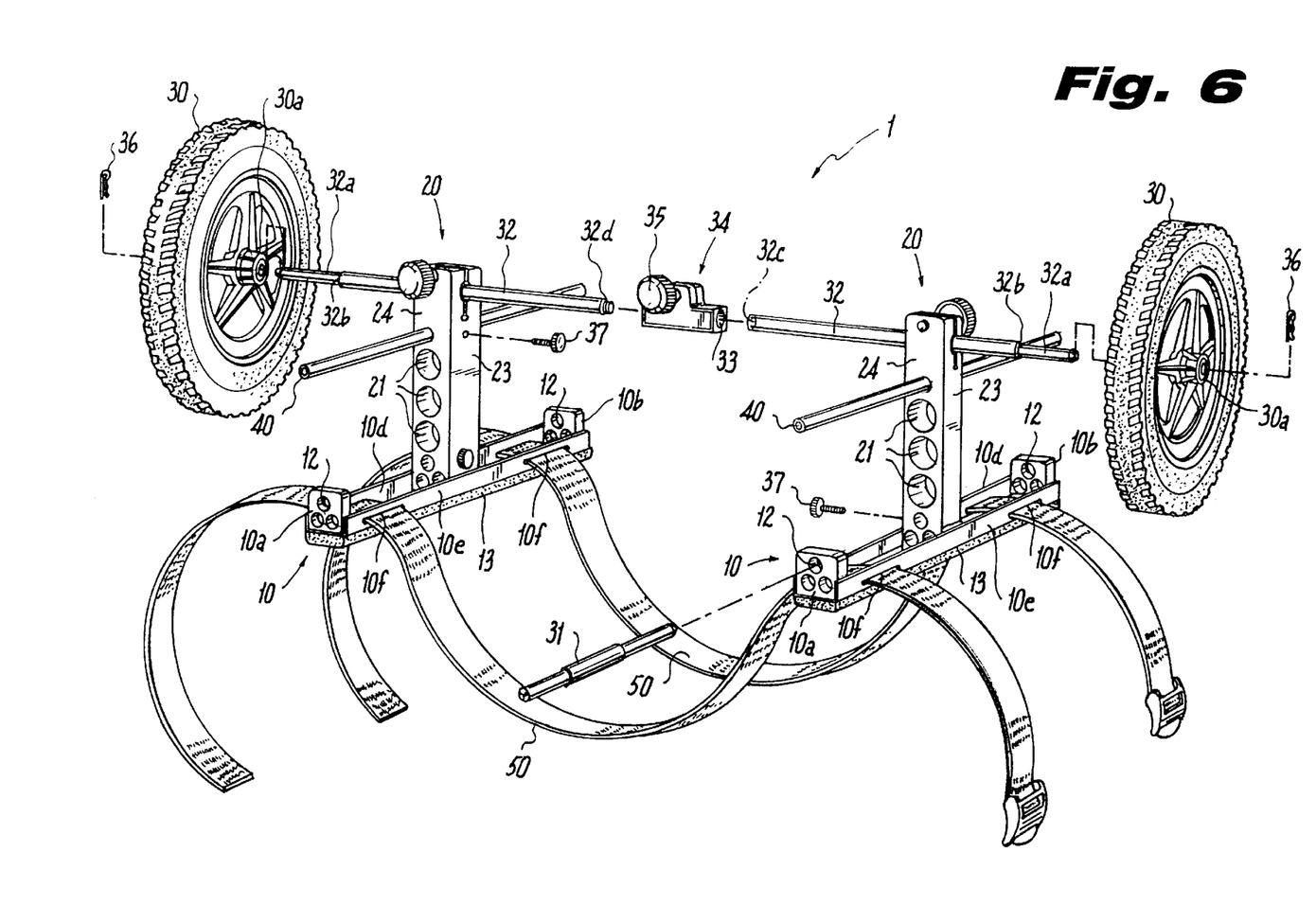
FIG. 6 is an exploded perspective view, inverted, of the components required to assemble the boat cart.

As also shown in FIGS. 3, 4 and 6, each wheel 30 is demountably attached at an end, respectively, to a pair of axle members 32, with axle members 32 extending inwardly from and demountably attached to lower portion 20a of said respective vertical struts 20, wherein axle members 32 are in a transverse relationship to horizontal load support members 10. Fasteners, 36, such as cotterpins, hold each wheel 30 upon each axle 32. Each axle member 32 is received within each hole 25, of each lower portion 20a of each vertical strut 20. A compression groove 27 exists from the underside of vertical strut 20 to hole 25 and continues to further through hole 27a, providing for compression of lower portion 20a of vertical strut 20.

To accommodate cargo, such as watercraft of varying widths, the distance between vertical struts 20 can be varied along the axle length by loosening and tightening the tightening member 28 and moving vertical struts 20 laterally apart or towards each other along axle members 32.

Although optionally a one piece axle may be used (not shown), preferably the pair of axle members 32 are held in opposite axial orientation by straight rigid axle connector 34. Axle connector 34 has tightening member 35, and a pair of receptacles 33 at the respective two ends of axle connector 34, so that axle members 32 respectively extend outwardly from, and are demountably attached within, said axle connector receptacle bore 33.

While the axle may be optionally a one-piece axle (not shown), preferably the pair of connected oppositely extending axle members 32 form an axle for wheels 30.

Each axle member 32 is made of solid round stock of anodized aluminum or stainless steel, approximately 0.75 inches in diameter. At the wheel-supporting end 32*a*, the diameter is about 0.59 inches in diameter with shoulders 32*b* of about 0.08 inches in height, transverse to the axis of axle member 32. These shoulders 32*b* provide a resting surface to prevent axial movement of wheel 30 upon axle member 32.

Figure 7:
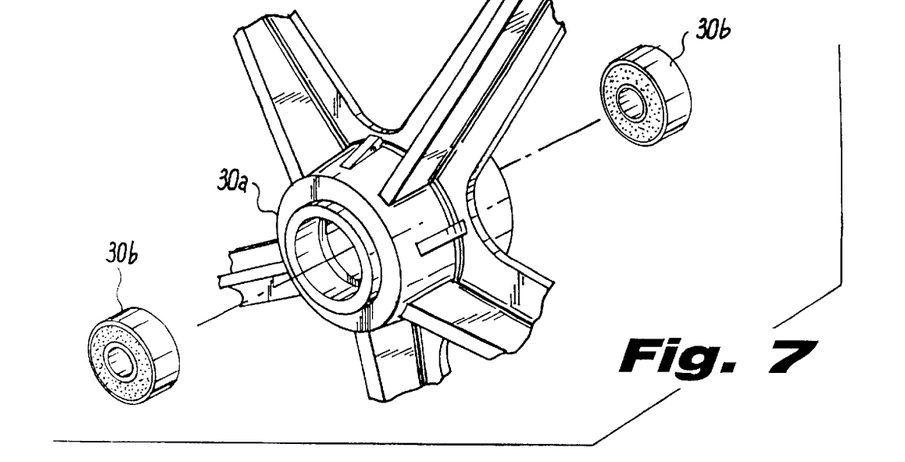
FIG. 7 is an exploded perspective of a typical wheel, showing two press fit bearings adjacent an integrally molded hub.
Figures 8, 9:
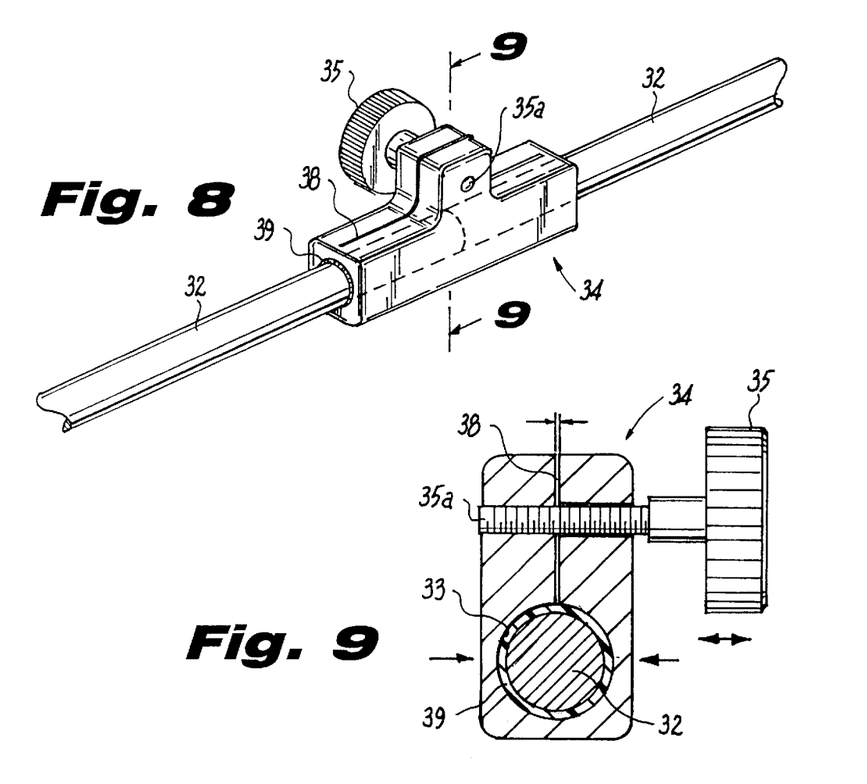
FIG. 8 is a perspective view of an axle locking member, installed on the assembled axle.
FIG. 9 is a sectional elevation view, taken through lines 9—9 of FIG. 8, showing the locking member compressing and locking the axle joint.

As shown in FIG. 7, each wheel 30 rotates about press fit bearings 32*b,* while each wheel 30 is positioned upon each respective axle member 32 of FIG. 8. As shown in FIG. 6, at the opposite end of one axle member 32, there is provided a hollow, threaded recess 32*c* of about 0.75 inches deep, to accommodate a connecting threaded member 32*d* of other axle member 32, to axially connect both axle members 32 together within axle connector 34, with a wheel 30 at each end.

FIGS. 8 and 9 show how axle connector 34 is compensated along groove 38, thereby locking axle members 32 within bushing 39, which is within receptacle bore 33 of axle connector 34, by tightening of tightening bolt 35*a* of tightening member 35. Preferably bushing 39 is a PVC (polyvinyl chloride) bushing. Groove 38 is preferably ¹⁄₁₆ to ⅛ inch, in width, which allows for the compression of axle connector 34 around axle members 32. Tightening bolt 35*a* is inserted within a conventional receptacle which is a through hole at the proximal end and which is tapped with threaded grooves at the distal end, to allow for compression of axle connector 34.

FIGS. 4 and 6 also show at least one kickstand 40, preferably a pair, respectively extending horizontally rearward from each lower portion of vertical struts 20. Each kickstand member 40 extends rearwardly from the at least one kickstand receptacle aperture 22 of respective vertical struts 20 and each kickstand 40 is demountably attached within each respective kickstand receptacle aperture 22. Each kickstand member 40 is preferably contoured so as to contact the ground to stabilize portable cart 1 in a parked position of rest.

Figure 5:
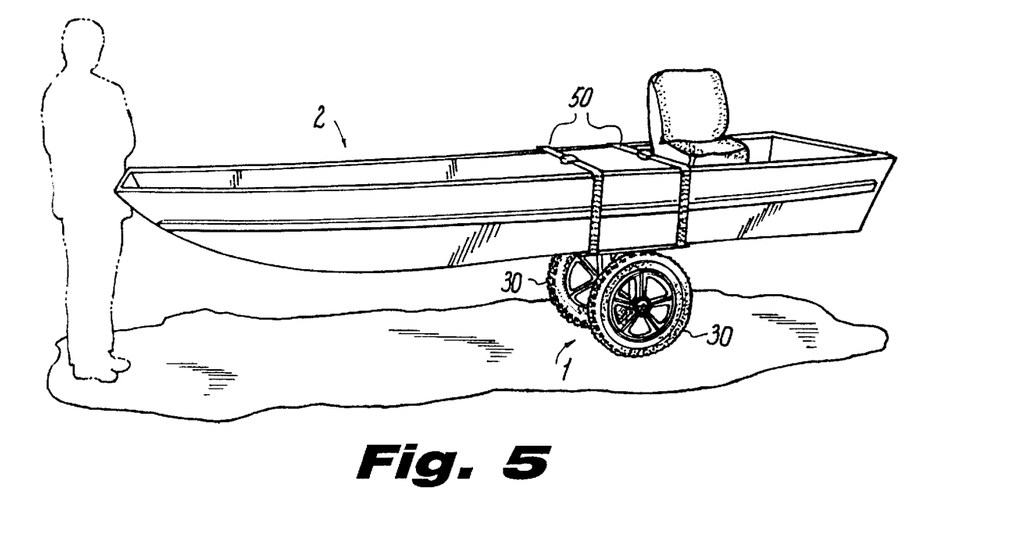
FIG. 5 is a perspective view of the assembled cart with a boat fastened for transport.

As shown in FIG. 5, to hold a canoe, game or cargo in place upon cart 1, one or more adjustable load-securing straps 50 are slidably attached to both respective horizontal load supports 10 in a transverse relationship to load supports 10. Straps 50 are preferably reinforced flexible canvas straps of about 2 inches in width.

To complete portable cart 1 as a canoe or boat cart, FIG. 4 shows support cushions 13 mounted upon respective horizontal load supports 10. Support cushions 13 are flexible, such as of rubber or foam, to support the weight of boat 2 thereon.

Figure 10:
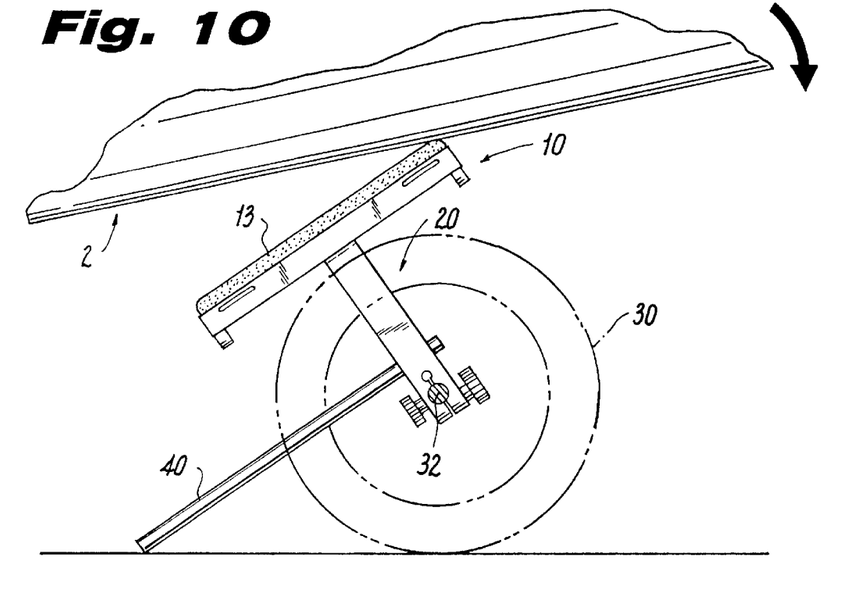
FIG. 10 is a diagrammatic side elevation view of the boat cart in its resting position, with a boat hull contacting the raised edge.
Figure 11:
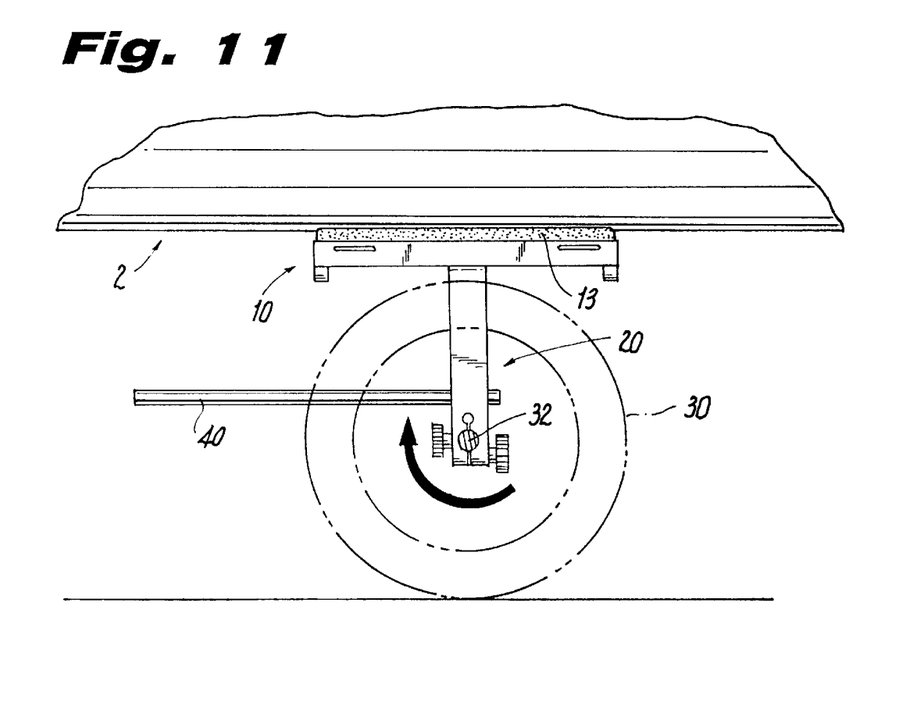
FIG. 11 is a diagrammatic side elevation view of the boat cart with the boat hull positioned and fully installed, illustrating the precision balancing feature of the cart.

FIGS. 10 and 11 show the precision balancing of boat 2 upon cart 1, wherein the placement of boat 2 upon cart 1 causes cart 1 to rotate from a position of rest in FIG. 10 to a horizontal load position of FIG. 11, in the direction of the arrow.

Figure 18:
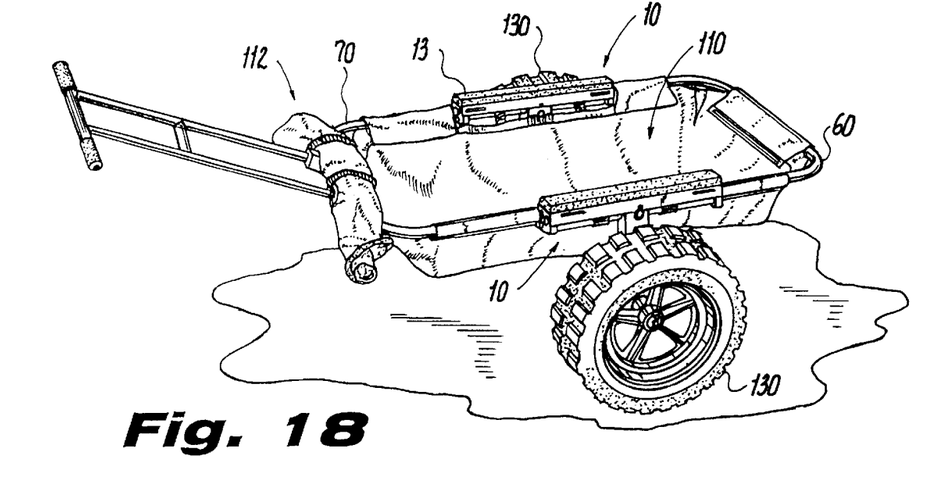
FIG. 18 is a perspective view of a further embodiment, a cart for transporting cargo, equipped with optional wide tires and axle for use on sand or granular terrain.
Figure 19:
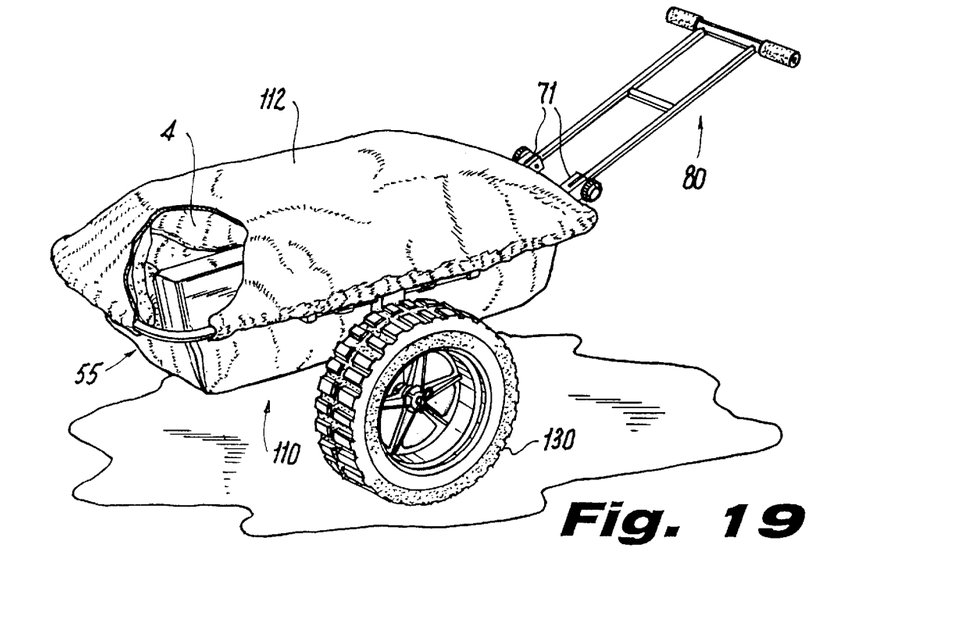
FIG. 19 is a perspective view of a fully loaded cargo cart, with the cover material partially cutaway to reveal its contents; and, FIG. 20 is an exploded perspective view, inverted, of the cargo cart, illustrating the attachment of the canvas material to the framework components.
Figure 20:
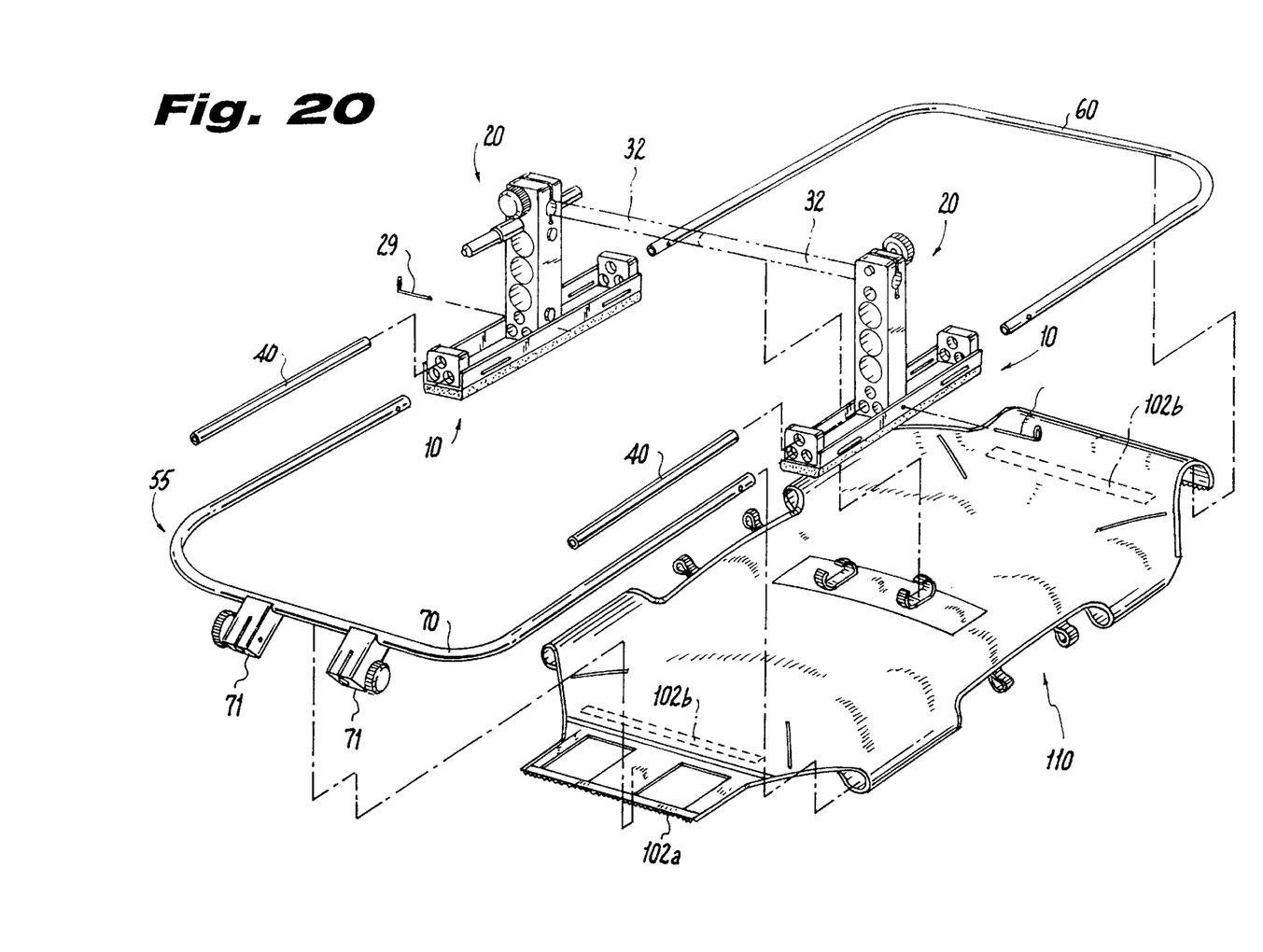

FIGS. 12–17 show how to convert portable cart 1 into a game cart. FIGS. 18–20 show how to convert cart 1 into a cargo wagon with a hollow well. First, in either situation, frame 55 is secured to horizontal load supports 10. Although a one piece, generally rectangular frame (not shown) may be used, preferably frame 55 includes a pair of U-shaped brackets 60, 70 joinable together to form frame 55.

U-shaped front bracket 60 extends horizontally forward from front-end receptacle apertures 12 of horizontal load supports 10, wherein front bracket 60 is demountably attached within front-end receptacle apertures 12 at one end of horizontal load supports 10.

U-shaped rear bracket 70 extends horizontally rearward from oppositely positioned rear end receptacle apertures 12 of horizontal load supports 10 and rear bracket 70 is demountably attached within each oppositely positioned rear end receptacle aperture 12 of horizontal load supports 10.

Figure 13:
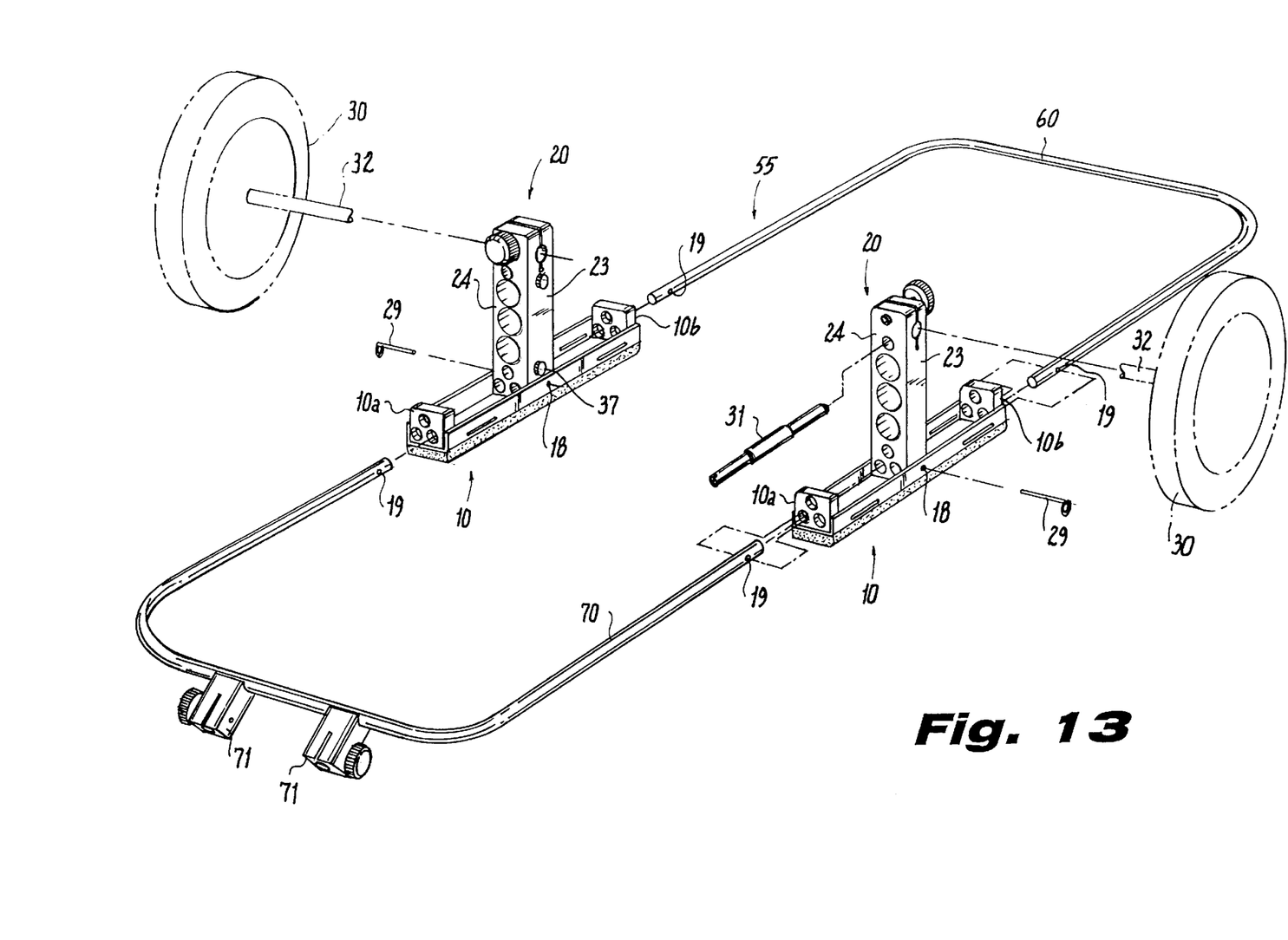
FIG. 13 is an exploded perspective view of the inverted gaming cart, illustrating the framework fastening method.

FIG. 13 shows how frame 55 is secured to cart 1. Each distal end of U-shaped front bracket 60 is inserted through apertures in respective ends 10*b* of horizontal supports 10 until each distal end engages a corresponding hole in each vertical support 20, where they are held in place by pins 29. Pins 29 engage lateral holes 18 in horizontal supports 10 and corresponding through holes 19 in distal ends of U shaped brackets 60. Likewise, each distal end of U-shaped rear bracket 70 is inserted through apertures in respective ends 10*a* of horizontal supports 10 until each distal end engages a corresponding hole in each vertical support 20, where it is also held in place by a pin 29. Pins 29 engage lateral holes 18 in horizontal supports 10 and corresponding through holes 19 in distal ends of U shaped brackets 60, 70 of frame 55.

U-shaped brackets 60, 70 are preferably of hollow, anodized aluminum tubing of about 0.75 inches in diameter. The length of each distally extending side member thereof is about 23.50 inches and the width of the cross bar connecting the distal side members is about 21.63 inches. About 0.75 inches from each distal end is a scoring, to accommodate a clamp thereon, to form frame 55.

Figure 15:
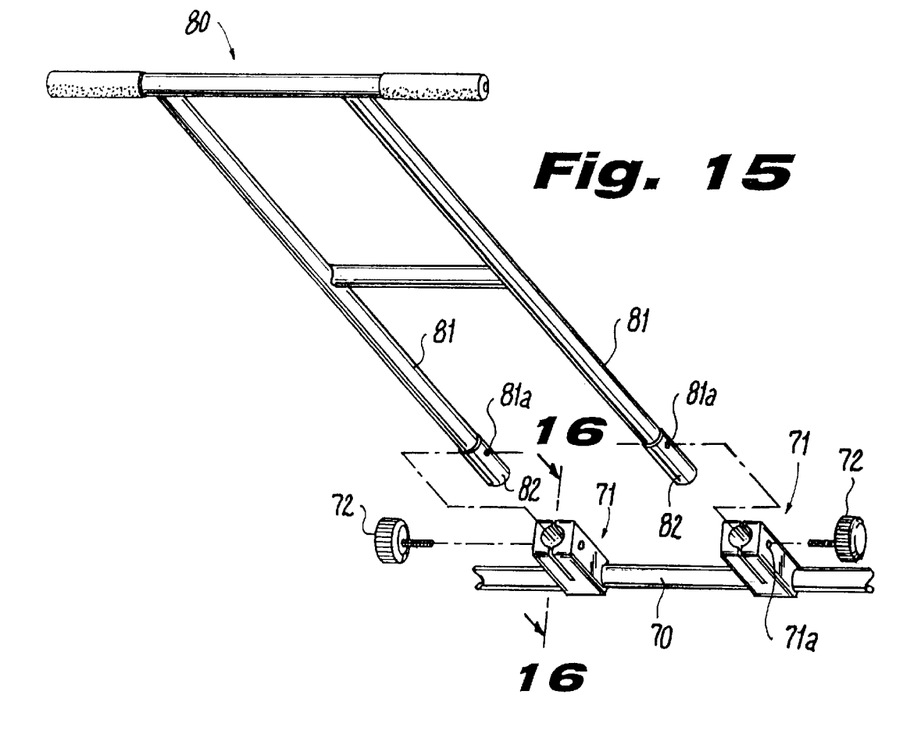
FIG. 15 is an exploded perspective view of the attachment of the handlebar component to the locking receptacles on the framework.
Figure 16:
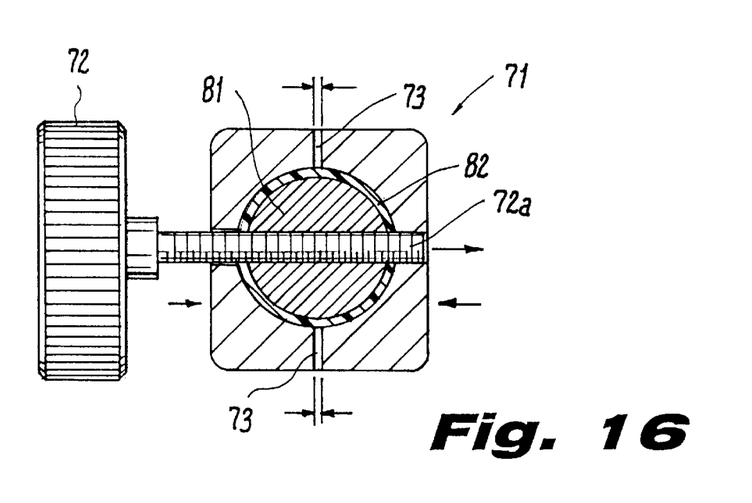
FIG. 16 is a sectional elevation view, taken through lines 16—16 of FIG. 15, showing the locking receptacles acting on the installed leg of the handlebar.

As shown in FIG. 15, for pulling or pushing game or cargo upon portable cart 1, handle 80 extends rearwardly at an upward angle from joints 71 of either U-shaped rear bracket 70 for pushing portable cart 1, or from front U-shaped bracket 60 for pulling portable cart 1 (not shown). Furthermore, handle 80 may be permanently attached to either U-shaped bracket 60 or 70, or handle 80 may be removable and demountably attached to either front U-shaped bracket 60 or rear U-shaped bracket 70. Handle 80 has preferably two aluminum tubing connecting members about 22.5 inches in length, connected by a hand accommodating transverse bar of solid aluminum, and is 17.5 inches in width. Handle 80 includes connectors 81, having distal sleeves, such as PVC (polyvinyl chloride) sleeves 82, permanently affixed thereto, which are insertable within joints 71 by locking member 72, having threaded member 72*a* which passes through bore 71*a* of joint 71 and bore 81*a* of handle 80. Compression groove 73 exists in joint 71, providing compression of joint 71.

Handle 80 may optionally have an auxiliary extension member and clamp (not shown), so that it can be attached to the rear frame of a bicycle (not shown), to pull portable cart 1.

Figure 12:
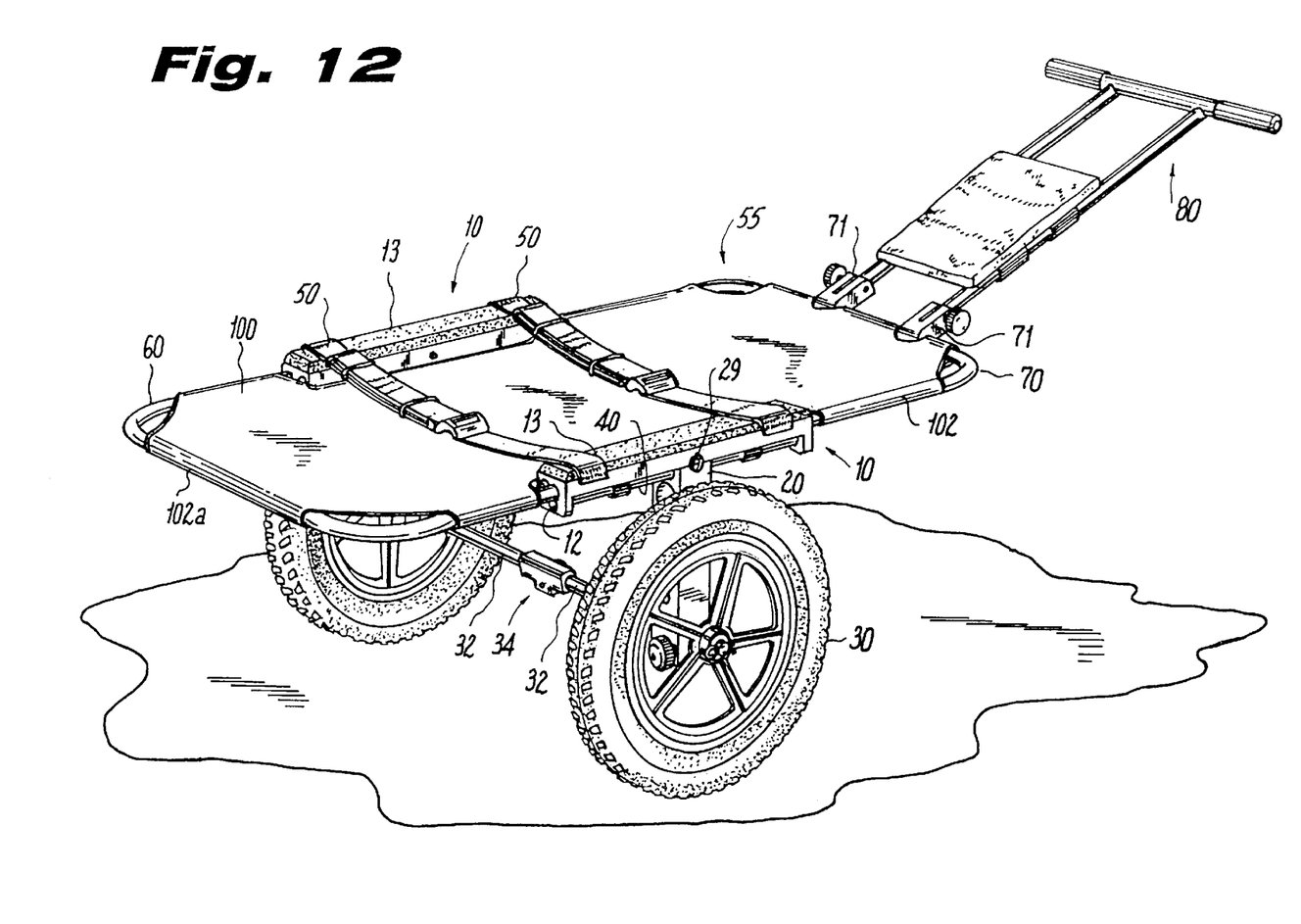
FIG. 12 is a perspective view of the assembled alternate embodiment cart, for hunting/gaming applications.
Figure 14:
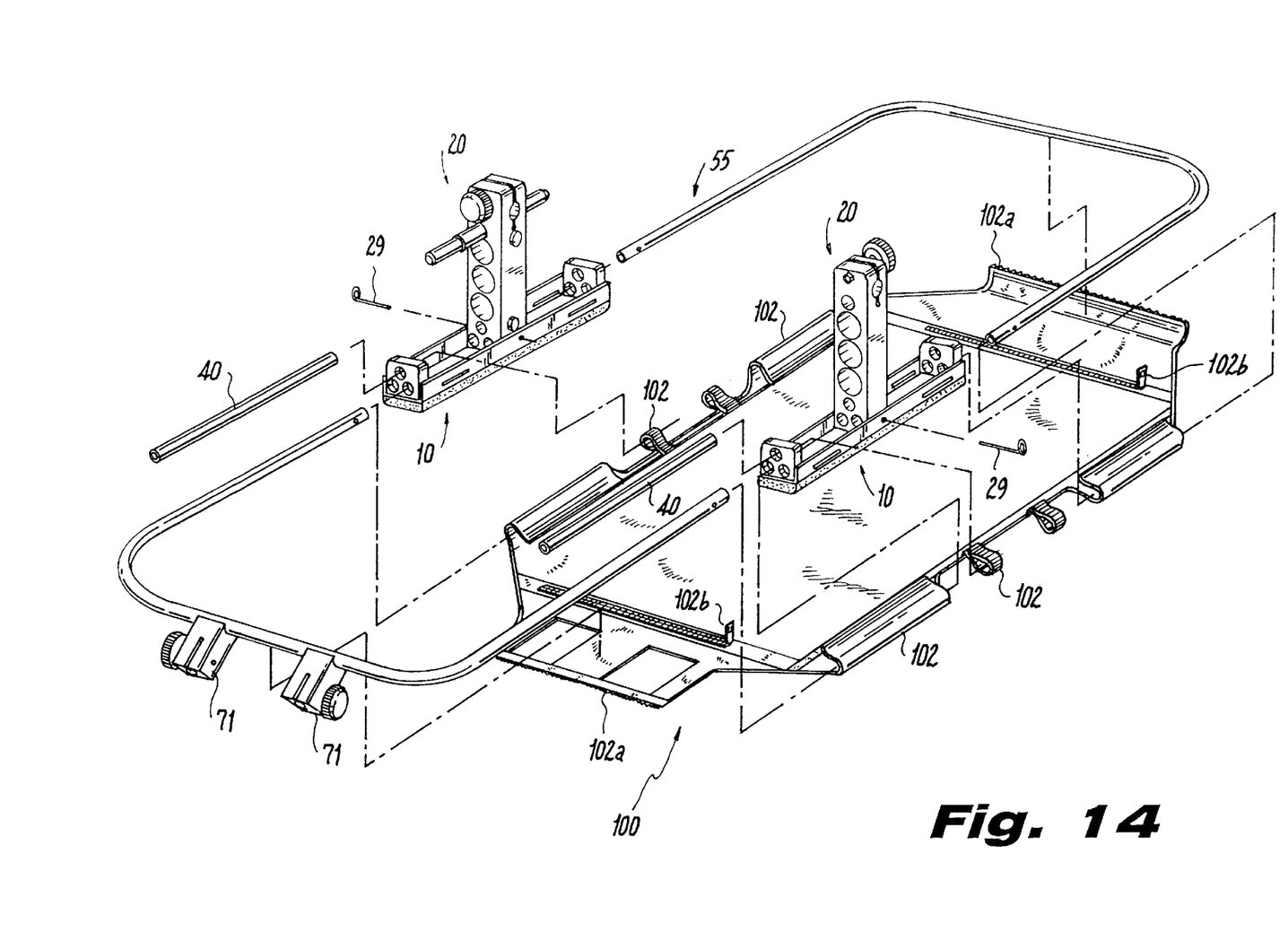
FIG. 14 is an exploded perspective view, inverted, of the gaming cart, illustrating the attachment of the stretcher canvas material to the framework components.
Figure 17:
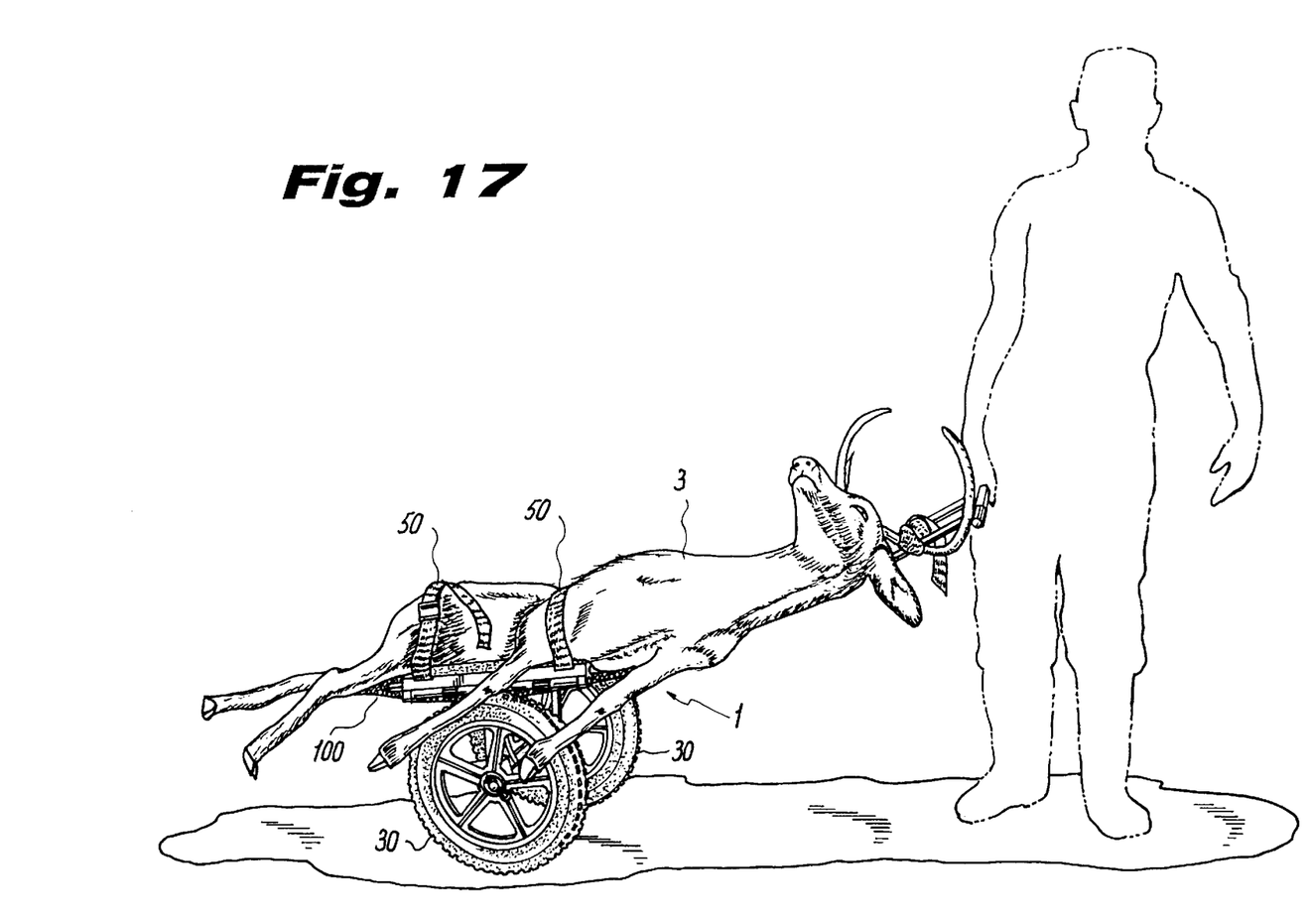
FIG. 17 is a perspective view of the gaming cart, with a deer fastened for transport.

To carry game 3, as shown in FIG. 17, or to carry an injured person in a rescue operation, FIG. 12 shows portable cart 1 having fabric stretcher 100 stretched tautly between horizontal load members 10 and preferably mounted over and around front and rear U-shaped brackets 60 and 70 of frame 55, by threading brackets 60, 70 through fasteners such as sewn-in loops 102 of fabric stretcher 100, which may alternatively be made of plastic or other taut load bearing material. Other types of fasteners can be used. For example, FIG. 14 shows that loop 102*a* is openable, and closed by fastener, such as zipper fastener 102*b*.

FIGS. 18–20 show that to carry cargo, hollow fabric cargo well 110 is attached in the same manner to frame 55. Hollow cargo well 110 may also alternatively be made of plastic or other taut load bearing material, and covered by cover 112. FIGS. 18 and 19 also show wider wheels 130 for use on sand or granular terrain.

Assembly and Disassembly

For making a canoe cart from the disassembled portable cart 1, wheel retaining members, such as cotter pins 36, are taken out of axle members 32 in their stored position, and wheels 30 come out. Axle members 32 are then removed from between vertical struts 20. The axle members 32 are then clamped in a horizontal use position into receptacles 33 of rigid axle connector 34. Axle members are inserted between vertical struts 20 and locked in place. Wheels 30 are placed upon axle members 32 and secured by cotter pins 36. Kickstand 40 is loosened from its rest position and placed in place in receptacles within vertical struts 20. Canoe supporting cushions 13 are installed upon horizontal load supports 10 to support a canoe or boat thereupon. Straps 50 hold the canoe or boat installed upon cushions 13 in a secure transportable position.

To convert portable cart 1 into a game cart or a rescue cart, kickstands 40 are removed and fabric stretcher 100 is installed on U-shaped frame members 60, 70 of frame 55 frames by fasteners such as sewn loops 102 thereof. U-shaped frame members 60, 70 are placed on horizontal load supports 10, and kickstand members 40 are installed as braces for fabric stretcher 100. Straps 50 are then installed to securely hold game or an injured party upon stretcher 100. Then handle 80 is installed upon U-shaped bracket 60 or 70 of frame 55 to pull or push portable cart 1.

To convert portable cart 1 into a wagon to haul cargo, fabric stretcher 100 is removed and hollow well 110 is installed over U-shaped members 60, 70 of frame 55.

To make the portable chart 1 portable again, the components are disassembled in reverse into bag 120. Strap or straps 50 are used as a carry handle or for backpack shoulder loops.

It is further noted that other modifications may be made to the present invention, without departing from the scope of the invention, as noted in the appended claims.

I claim:

1. A cart collapsible for storage and transport and expandable for use in carrying a load, comprising:
   a pair of parallel, spaced apart horizontal rigid load support members; said support members each being in the shape of an inverted U in cross section with a rectangular well and having a front end wall portion and a rear end wall portion;
   a downward extending vertical strut for each of said support members having an upper end received within the well of each of said support members;
   a wheel demountably attached to a lower end of each vertical strut, and a demountable axle means for attaching said wheels to said vertical struts; and
   means in said support members to store and retain said axle means within said rectangular well when said cart is collapsed, with said pair of said support members and vertical struts being placed adjacent to each other to allow convenient carrying of said cart after collapsing.

2. The cart as in claim 1 wherein said axle means comprises means to adjust the spacing between said support members and said vertical struts to vary the width of said cart.

3. The cart as in claim 2 wherein said axle means comprises a pair of axle members, said axle members connected axially together by a connector, and means in the rectangular wells and front and rear ends of said support members and said vertical struts to accommodate said connector and axle members.

4. The cart as in claim 3 wherein said connector is a straight rigid axle connector, having a pair of receptacles at the respective two ends of said axle connector, said axle members respectively extending outwardly from and demountably attached within said axle connector receptacles.

5. The cart as in claim 3 wherein said vertical struts, said wheels and said axle members are demountably attached to said horizontal load support members to comprise a folded manually transportable cart.

6. The cart as in claim 1 further comprising a pair of adjustable load-securing straps slidably attached to both respective horizontal load support members in transverse relationship to said load supports.

7. The cart as in claim 1 further comprising a carry means for carrying an object therewith.

8. The cart as in claim 7 wherein said carry means comprises a frame demountably attachable to said horizontal support members.

9. The cart as in claim 8 wherein said carry means further comprises a stretcher demountably attachable to said frame attachable to said horizontal support members.

10. The cart as in claim 8 wherein said carry means further comprises a hollow cargo carrying well demountably attachable to said frame attachable to said horizontal support members.

11. The cart of claim 10 further comprising a cover over said hollow cargo carrying well.

12. The cart as in claim 8 further comprising a handle.

13. The cart as in claim 12 wherein said handle is attached to said frame.

14. The cart as in claim 13 wherein said handle extends rearwardly at an upward angle from one of said U-shaped brackets.

15. The cart as in claim 8 wherein said frame comprises a pair of U-shaped brackets each having a pair of distal spaced apart ends, each said U-shaped bracket connected with each other said U-shaped bracket in an axially laid position.

16. The cart of claim 15 wherein a U-shaped front bracket of said pair of U-shaped brackets extends horizontally forward from front end receptacle apertures of said horizontal support members, said front bracket being demountably attached within said front end receptacle apertures and a U-shaped rear bracket of said pair of U-shaped brackets extends horizontally rearward from said rear end receptacle apertures of said horizontal load supports, said rear bracket being demountably attached within said rear end receptacle apertures.

17. The cart of claim 8 wherein said carry means comprises fasteners through which said frame is inserted.

18. The cart of claim 1 further comprising at least one kickstand member respectively extending horizontally rearward from a lower portion of at least one of said vertical struts; and at least one lower kickstand member being demountably attached to said vertical struts.

19. The cart of claim 18 wherein said at least one kickstand member extends rearwardly from the at least one kickstand receptacle aperture of said vertical struts, said at least one kickstand being demountably attached within said kickstand receptacle aperture; said at least one kickstand being contoured so as to contact the ground.

20. The cart of claim 18 wherein said at least one kickstand member is a pair of kickstand members.

* * * * *